United States Patent [19]

Takano et al.

[11] Patent Number: 4,710,659
[45] Date of Patent: Dec. 1, 1987

[54] RESIN MOLDED ROTOR FOR A MAGNETO GENERATOR

[75] Inventors: Masami Takano; Yukio Tamura, both of Gunma, Japan

[73] Assignee: Sawafuji Electric Co., Inc., Tokyo, Japan

[21] Appl. No.: 897,263

[22] Filed: Aug. 18, 1986

[30] Foreign Application Priority Data

Aug. 28, 1985 [JP] Japan .......................... 60-131353[U]

[51] Int. Cl.⁴ .......................................... H02K 21/12
[52] U.S. Cl. ...................................... 310/153; 310/43
[58] Field of Search .......... 310/40 MM, 42, 43, 49 R, 310/153, 156, 261, 268

[56] References Cited

U.S. PATENT DOCUMENTS

| 4,144,469 | 3/1979 | Miyashita et al. | 310/156 |
| 4,390,804 | 6/1983 | Orova et al. | 310/153 |
| 4,588,912 | 5/1986 | Shinmura et al. | 310/43 |

Primary Examiner—Patrick R. Salce
Assistant Examiner—D. L. Rebsch
Attorney, Agent, or Firm—Dennis J. Williamson

[57] ABSTRACT

In the rotor of a magneto generator, which has a magnet for generating electric power, the mechanical strength of the rotor is born by a metal core, and the metal core is connected to a resin molded disk by insert molding. The rotor is light and can bear the centrifugal force of high-speed revolution.

10 Claims, 7 Drawing Figures

RESIN MOLDED ROTOR FOR A MAGNETO GENERATOR

BACKGROUND OF THE INVENTION

1. Field of the Invention

This invention relates to a rotor for a magneto generator, and specifically to a rotor that revolves synchronously with an engine, and has a magnet, the flux of which interlinks with a stator coil for generating electric power.

2. Description of Prior Art

In a small internal combustion engine, a magneto generator is used to create electric power for providing ignition to the engine. The generator has a rotor with a magnet, and a stator coil stationarily situated on the outside of the magnet. When the rotor revolves, the flux of the magnet interlinks with the stator coil to generate electric power which ignites the engine.

When an engine with this kind of magneto generator is used on a machine that is hand held, for example a chainsaw, or manually manipulated, for example a lawn mower, the engine should be light, otherwise the operator of the machine will immediately become tired. Also the efficiency of the work performed by the engine is lowered when the engine is heavy. For these reasons, the rotor of the magneto generator of the engine should be light.

Generally, one skilled in the art would directly consider forming the rotor using molded resin to lighten the rotor. But it is impossible for such a molded rotor to bear the centrifugal force of the number of revolutions of the rotor, which is more than 15000 rpm, causing the rotor will be broken by the high-speed revolution. Therefore the conventional rotor of the magneto generator is made through a die casting method by aluminum alloy. The aluminum rotor is heavy relative to a resin rotor, and includes many parts which make assembly troublesome, thus raising the cost of the rotor.

OBJECTS AND SUMMARY OF THE INVENTION

Accordingly, it is an object of this invention to provide a rotor for a magneto generator that is light weight and yet strong enough to bear the centrifugal force of the high-speed revolution of the rotor.

Another object of this invention is to provide a rotor for a magneto generator which has fewer parts and is less expensive than the conventional rotor.

A further object of this invention is to provide a rotor for a magneto generator which generates sufficiently high electric power to ignite an engine.

A still further object of this invention is to provide a rotor for a magneto generator which is securely fastened to a crankshaft of an engine.

In accordance with one aspect of this invention, there is provided a rotor for a magneto generator comprising:

a magnet for generating electric power;

a metal core for supporting the mechanical strength;

a holding portion formed on said metal core for holding said magnet; and a moulded resin disk connected to said metal core by insert molding.

The above, and other objects, features and advantages of the invention will be apparent from the following detailed description of an illustrative embodiment which is to be read in connection with the accompanying drawings.

DESCRIPTION OF THE PREFERRED EMBODIMENTS

Figure 2:
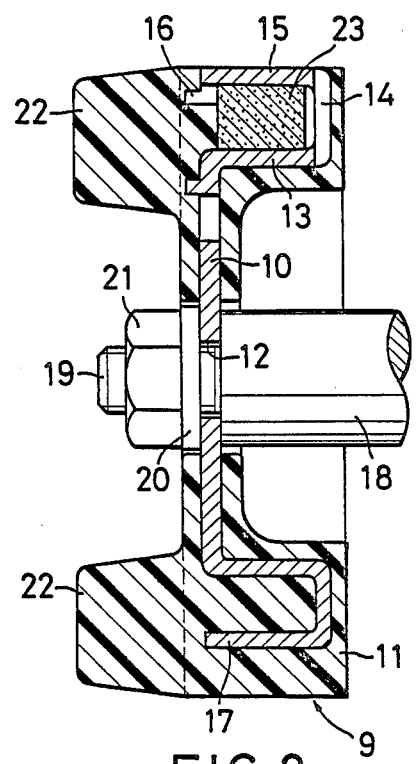
FIG. 2 is a cross section of the molded rotor of the generator.
Figure 3:
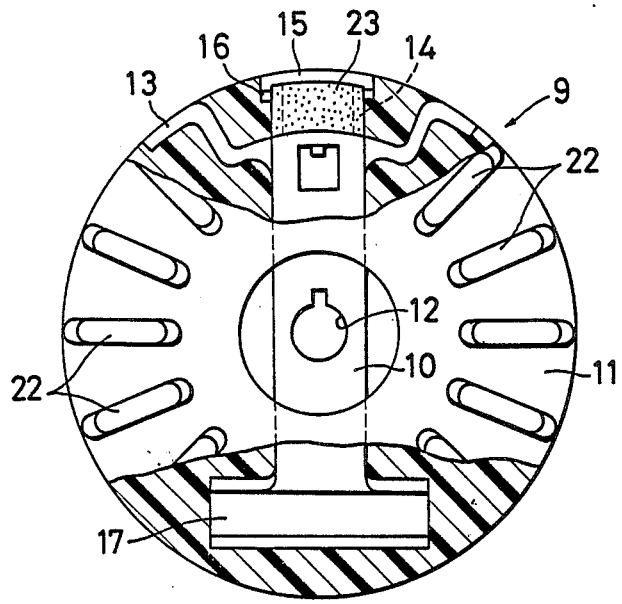
FIG. 3 is a front view of a rotor of the generator, partially broken.

A first embodiment of this invention will be described with reference to FIG. 1 through FIG. 3. A rotor 9 of a generator of this invention includes a core 10 and a resin molded disk 11. The core 10 is made of a steel plate which is blanked and bent as shown in FIG. 1.

The center, that is, the intermediate portion of the core 10 constitutes a support portion which has a fastening opening 12 for connecting the rotor 9 to a crankshaft of an engine. A pair of poles or pole portions 13 are formed integrally on the support portion of the core 10. Between the two poles 13, another pole, a center pole 15 is arranged and is connected to the support portion of the core 10 by means of a pair of bridges 14. A pair of projections 16 are formed on the top of the pole 15. On the other end of the core 10, a balance weight 17 is formed under the support portion of the core 10.

Figure 1:
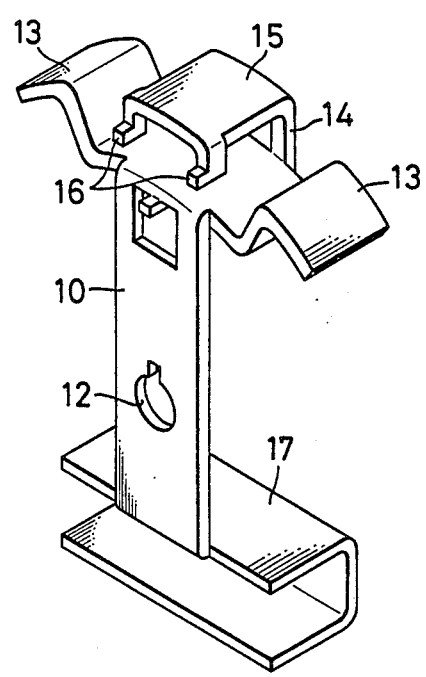
FIG. 1 is a perspective view of a core of a rotor of a magneto generator according to a first embodiment of this invention.

The core 10, shown in FIG. 1, and a magnet 23 are arranged in a molding die where the disk 9 is molded from resin. Namely the rotor 9 is obtained by means of insert molding of a molded disk 11 which is connected to the core 10 and the magnet 23 as shown in FIG. 2 and FIG. 3. The fastening opening 12 of the rotor 9 receives a bolt 19 formed on the top of a crankshaft 18. The rotor 9 is fastened by a washer 20 and a nut 21 to the engine. The molded disk 11 has plural fans 22 for cooling the engine.

According to the rotor 9 of the magnetic generator of this embodiment, the core 10 bears the mechanical strength and the molded disk 11 gives the rotor a circular shape. Hence the rotor 9 can bear the centrifugal force of high-speed revolution, and therefore the rotor 9 can be used with high-speed revolutions region which would ordinarily entail breakage in a conventional rotor. Furthermore the molded disk 11 is lighter than a disk made of aluminum alloy, and therefore the weight of the rotor 9 is less. The light rotor is suitable for adaptation to an engine which is manually manipulated. Additionally, the rotor has fewer parts than a conventional rotor and thus has a lower manufacturing cost, because the core 10 is connected to the molded disk 11 by insert molding. Two kind of poles 13 and 15 are connected to each other by bridges 14. The bridges 14 will immediately be saturated by magnetic flux and thereby prohibit any additional magnetic flux from entering the bridges 14 because the area of the cross section of the bridges 14 is very small, and for this reason the efficiency of the generator is not lowered.

Next, a second embodiment of this invention will be described with reference to FIG. 4 through FIG. 6. In this and the following embodiments, the same reference numerals as those mentioned above in the first embodiment will be used, and descriptions for corresponding portions with the same construction will be omitted.

Figure 4:
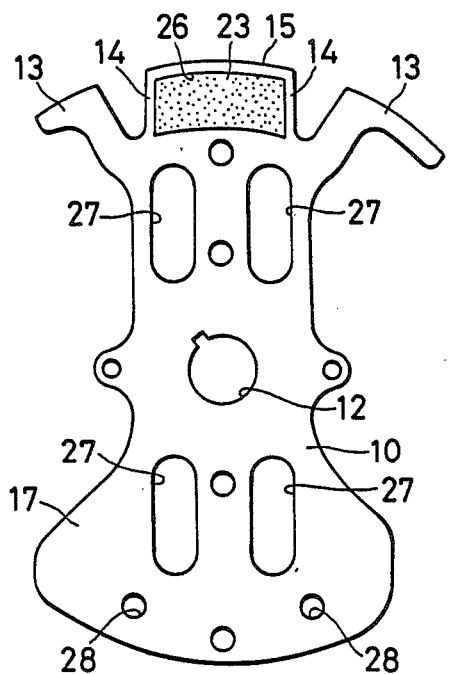
FIG. 4 is a front view of a core of a rotor according to a second embodiment of this invention.

FIG. 4 shows a core 10 for a rotor 9 of a magneto generator of the second embodiment. The core is made of blanked steel plate and is laminated to form the core. A pair of poles 13 are formed on the both sides of the upper top of the core 10. Between the two pole cores 13, a center pole 15 is formed. The center pole 15 is formed on an edge of an opening 28 which constitutes a holding portion 26 for the magnet 23. Namely the holding portion 28 for the magnet 23 is comprised of bridges 14 on both sides and an upper pole 15. A balance weight 17 is integrally formed at the bottom end of the core 10. Oblong openings 27 and holes 28 are formed on the core. The openings 27 are formed to reduce the weight of the rotor 10. The holes 28 are formed to regulate the weight of the balance 17. At the center of the core 10, is a fastening opening 12 with a key way for fastening the rotor onto the engine.

Figure 5:
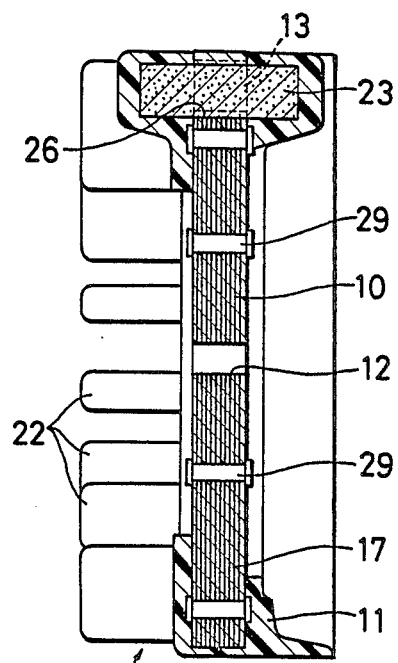
FIG. 5 is a cross section of the molded rotor of the generator.
Figure 6:
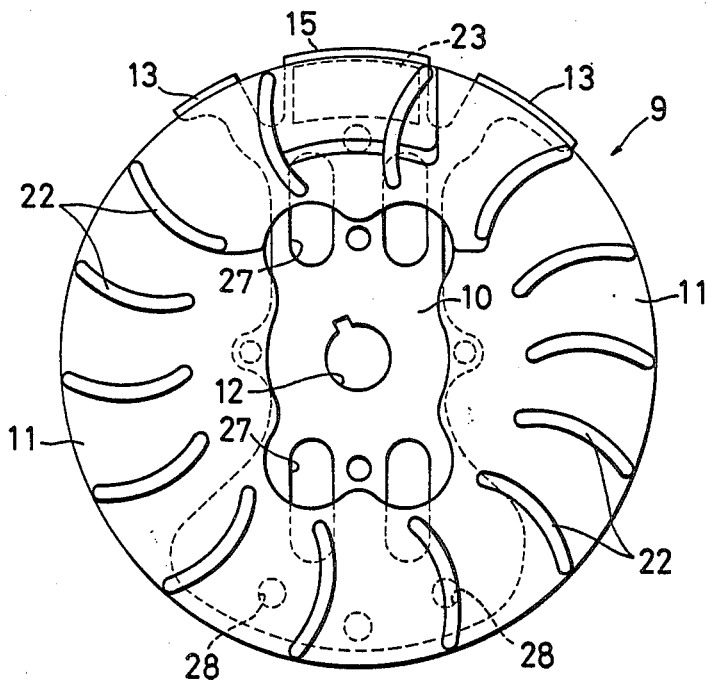
FIG. 6 is a front view of the molded rotor of the generator.

A predetermined number of blanked plates are laminated to form the core 10, and a magnet 23 is provided on a holding portion 26 as shown in FIG. 4 and FIG. 5. Both ends of the magnet 23 project from the surface of the core 10. The core 10 with the magnet 23 thereon is arranged inside a molding die, and melted resin for example Nylon. Polypropylene etc. is injected into the cavity of the die. Thus a moulded disk 11 is obtained where the disk is connected to the core 10 by insert molding, such that the rotor 9 is made of the core 10 and the disk 11. The disk 11 has a circular shape as shown in FIG. 5 and FIG. 6 and has plural cooling fans 22 on the other edges.

According to the rotor 9 of this embodiment, the core 10 is made of blanked steel plates, and the blanking process is performed very precisely. Accordingly it is not necessary for machining the rotor after the molding process. Furthermore, it is also not necessary to regulate the balance weight, because the balance weight is regulated by the regulating openings 28 which are formed before the disk 11 is molded. Hence the characteristics of the rotor are not changed from the original design, and all the rotors have substantially the same degree of precision and stability. The core 10 and the disk 11 are securely connected to each other, and the cooling fans 22 are sufficiently strong, because the melted resin is introduced into the openings 27 and holes 28.

The rotor 9 of this embodiment includes a magnet 23 for generating electric power, where the axial dimension of the magnet 23 is larger than the thickness of the core 10 as shown in FIG. 5. According to the experiments conducted by the inventors of this invention, the best power is obtained when the axial dimension of the magnet 23 is 25 mm, provided that the thickness of the core 10 is 8 mm. This thickness of the laminated core 10 may be from 4 to 15 mm and the axial dimension of the magnet 23 may be from 20 to 30 mm, thus allowing selection of various combinations of dimension in these ranges, when an ignition power of 15 KV for a 15000 rpm engine is used to ignite a small 2 cycle engine. Therefore, ignition energy can economically be obtained when the magnet 23 projects from the core 10 at a length of from 2.5 to 13 mm.

Figure 7:
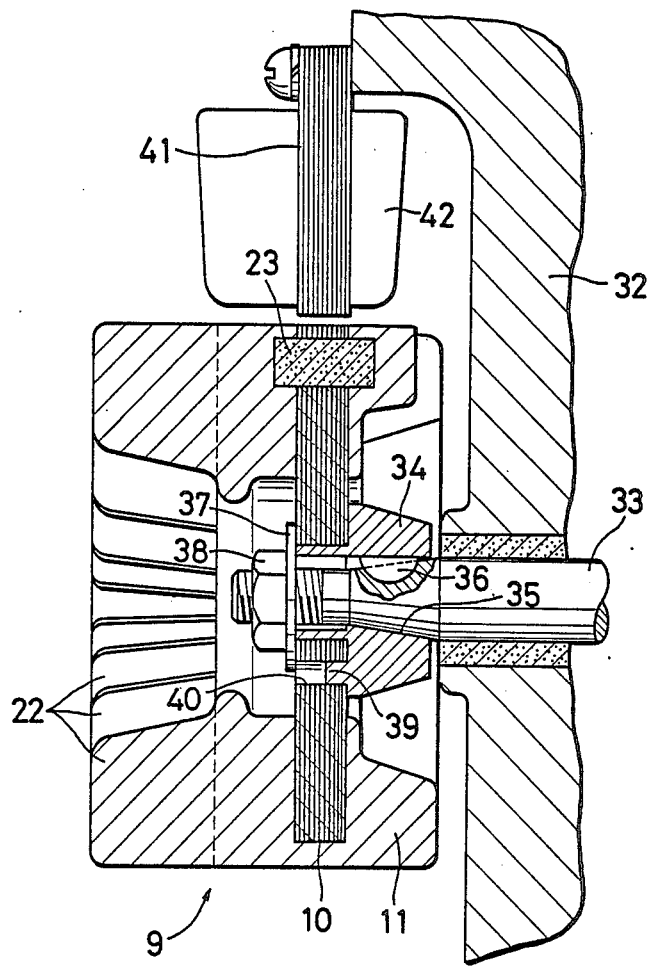
FIG. 7 is a cross section of the molded rotor according to a third embodiment of this invention.

Next, a third embodiment of this invention will be described with reference to FIG. 7. A rotor 9 of this embodiment includes a boss member 34 which is made of an aluminum alloy. The boss member 34 has a tapered hole 35 and a projection 39 for positioning the rotor 9. The tapered hole 35 is fitted with the top end of a crankshaft 33, and a key 36 is inserted between the boss member 34 and the crankshaft 33 for positioning the member 34 in a circular direction relative to the shaft 33. The projection 39 of the boss member 34 is received in an engaging hole 40 formed on the core 10 of the rotor 9, and the rotor 9 is fastened to the crankshaft 33, through the boss member 34, by a washer 37 and a nut 38 which is engaged with a screw of the crankshaft 33.

When the engine is driven, the crankshaft 33 revolves and hence the rotor 9 is also driven through the boss member 34. The rotor 9 revolves at the same revolutional speed as the engine. Accordingly, the flux of the magnet 23 of the rotor 9 interlinks with a stator coil in a case 42, and the stator coil generates electric power which ignites the engine. The cooling fans 22 generate a cooling window for cooling the engine 32.

According to the rotor 9 of this embodiment, the fastening of the rotor 9 on the crankshaft 33 is accomplished by a boss member 34 with a tapered hole 35. Namely the tapered hole 35 of the boss member 34 is fitted to the top end of the crankshaft 33, and the boss member 34 is affixed to the crankshaft 33 by the washer 37 and the nut 38. Thus, with this arrangement, the rotor 9 is securely connected to the crankshaft 33. The angular position of the rotor 9 is regulated relative to the crankshaft 33 through the key 36, and for this reason the generator, with this rotor, ignites the engine at the proper moments.

Having described specific embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A resin molded rotor for a magneto generator comprising:

a magnet for generating electric power;

a metal core made of a ferromagnetic substance for supporting the mechanical strength;

a holding means formed on said metal core for holding said magnet;

a first pole portion integrally formed with said metal core, said first pole portion being formed on and extended from a first receiving portion of said holding portion where one pole of said magnet is received;

a second pole portion integrally formed with said metal core, said second portion being formed on and extended from a second receiving portion of said holding means where another pole of said magnet is received;

a pair of bridges formed with said metal core and arranged side-by-side for connecting said first receiving portion with said second receiving portion, said bridges being narrowly dimensioned such that they will be immediately saturated by magnetic flux thereby prohibiting any additional magnetic flux from entering said bridges; and a molded resin disk connected to said metal core by insert molding to give the rotor a circular shape.

2. A resin molded rotor for a magneto generator according to claim 1, wherein said first pole portion is formed integrally on said first receiving portion of said holding means where one pole of the magnet is received, and said second pole portion consists of a pair of members that extend laterally from said second receiving portion of said holding means where another pole of said magnet is received, said first pole portion being positioned between said pair of members of second pole portions on the periphery of said molded resin disk.

3. A resin molded rotor for a magneto generator according to claim 1, wherein said core is made of laminated steel plates, and said holding portion for holding said magnet comprises an opening formed in said laminated steel plates.

4. A resin molded rotor for a magneto generator according to claim 3, wherein the axial dimension of said magnet is larger than the thickness of said laminated core, and the top of the magnet projects on at least one end surface of said core.

5. A resin molded rotor for a magneto generator according to claim 3, wherein said laminated core is integrally provided with a balance weight.

6. A resin molded rotor for a magneto generator according to claim 3, wherein said laminated core has holes for regulating the balance weight.

7. A resin molded rotor for a magneto generator according to claim 1, wherein said rotor further includes a boss member with a tapered hole for fastening said rotor onto a tapered portion of a crankshaft of an engine.

8. A resin molded rotor for a magneto generator according to claim 7, wherein a key is inserted between said boss member and said crankshaft for positioning said rotor in a circular direction.

9. A resin molded rotor for a magneto generator according to claim 1, wherein said molded disk is integrally provided with fans for cooling an engine.

10. A resin molded rotor for a magneto generator according to claim 3, wherein the rotor further includes a boss member made of metal or an alloy material with a tapered hole for fastening the rotor onto a tapered portion of a crankshaft of an engine.

* * * * *